United States Patent [19]

Davis

[11] 3,717,186
[45] Feb. 20, 1973

[54] SHAPER APPARATUS FOR WOODWORKING

[75] Inventor: Burnice D. Davis, Jasper, Tex.

[73] Assignee: Visador Company, Jasper, Tex.

[22] Filed: Jan. 8, 1971

[21] Appl. No.: 104,862

[52] U.S. Cl. .............................................. 144/145 A
[51] Int. Cl. .............................................. B27c 5/06
[58] Field of Search ......... 144/145 A, 145 R, 144 R, 144/134 R, 134 A, 37, 3 R; 90/13 T

[56] References Cited

UNITED STATES PATENTS

| | | | |
|---|---|---|---|
| 1,567,865 | 12/1925 | Sawyer | 144/145 A |
| 3,165,976 | 1/1965 | Haspel | 144/144 R |
| 2,751,944 | 6/1956 | Stoil et al. | 144/134 R |
| 2,851,071 | 9/1958 | Schils | 144/144 R |
| 3,421,559 | 1/1969 | Frano | 144/145 R |

*Primary Examiner*—Donald R. Schran
*Attorney*—Diller, Brown, Ramik & Holt

[57] ABSTRACT

Apparatus for woodworking including first and second feed rolls coaxially mounted with respective first and second shaper spindles carrying knife means for engaging a workpiece carried through the work station on a template driven by the feed rolls. A first drive means is connected to the feed rolls and a second drive means is connected to the shaper spindles and adjustable mounting means are provided for adapting the device to different sized workpieces. The feed rolls are differentially driven, in opposite directions, while tool means carried by the shaper spindles are rotated in the same direction, in timed relation to each other, so that the cutting strokes of the tools can overlap.

18 Claims, 8 Drawing Figures

PATENTED FEB 20 1973 3,717,186

INVENTOR
BURNICE D. DAVIS

By
Willian Brown  Ramik Nass
ATTORNEYS

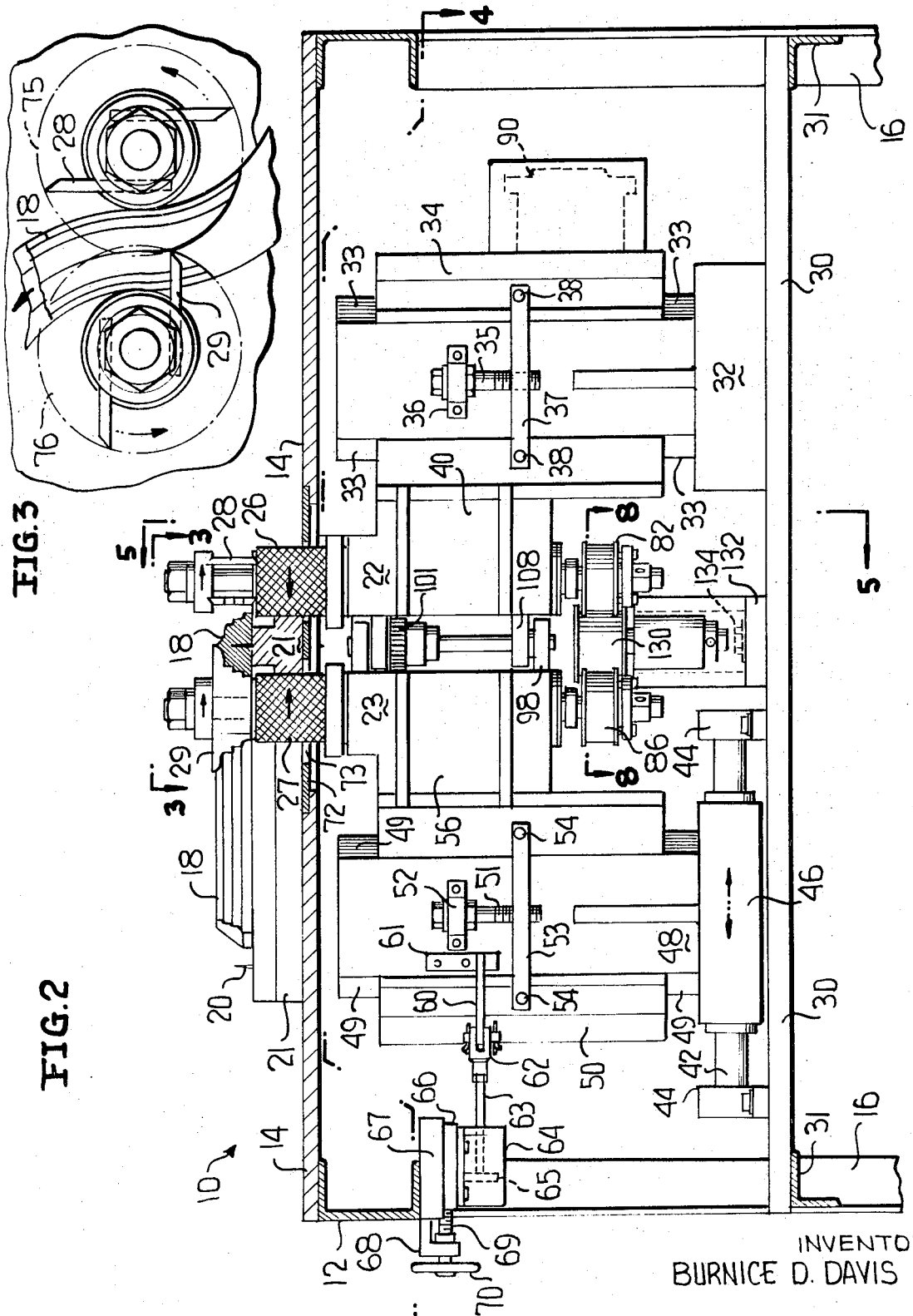

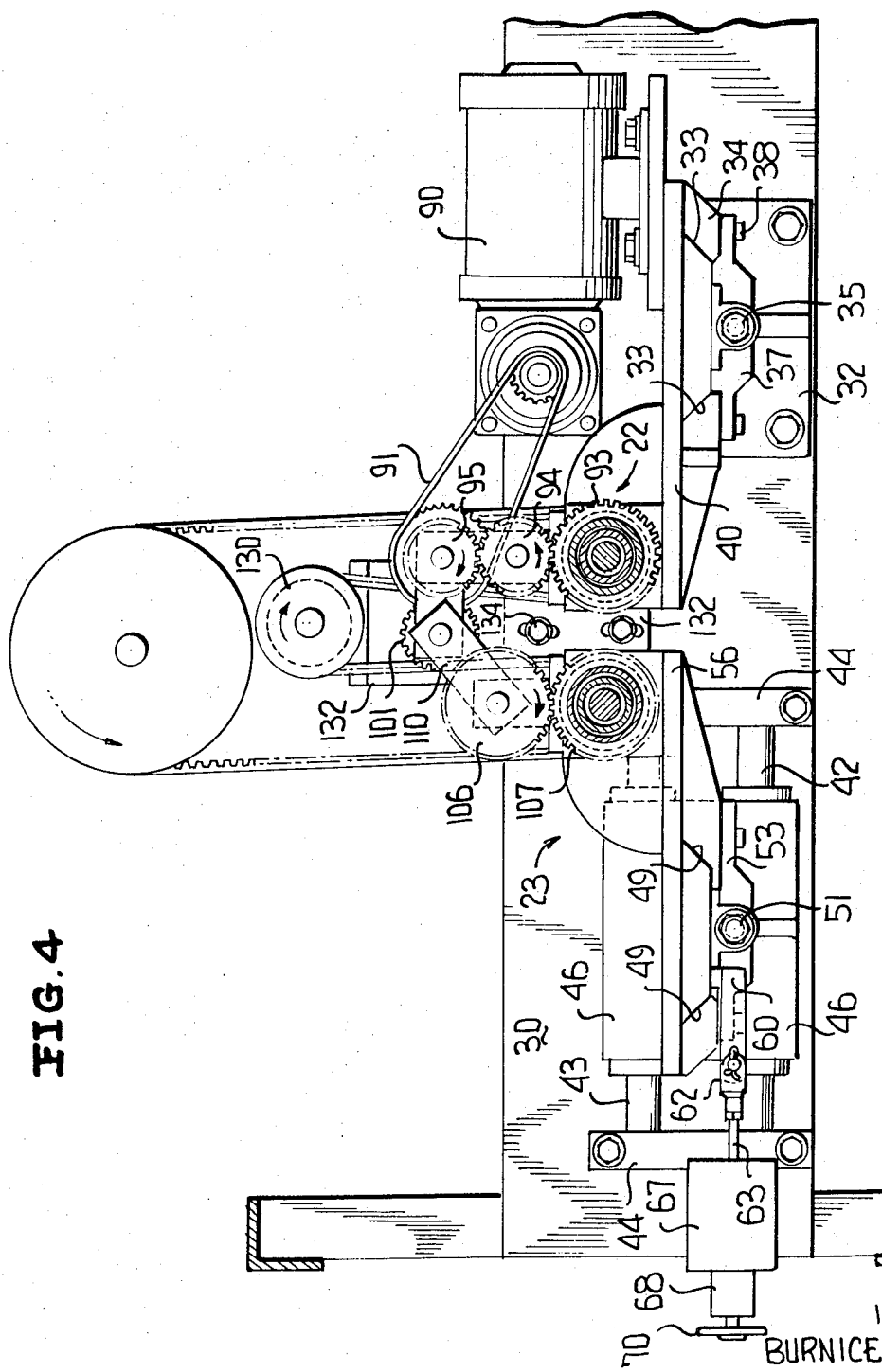

INVENTOR
BURNICE D. DAVIS

By
Diller Brown, Ramik, Holt
ATTORNEYS

SHAPER APPARATUS FOR WOODWORKING

BACKGROUND OF THE INVENTION

1. FIELD OF THE INVENTION

The invention relates to a woodworking apparatus for scroll work for producing attractively designed mouldings, slats, louvers and decorative trim.

2. Description of the Prior Art

Previously known woodworking machines, such as those exemplified by U.S. PAT. NO. 834,970 and U.S. PAT. NO. 1,890,488, have been generally provided with spaced feed rolls for moving a workpiece through the machine and cutter members or knife means spaced along the workpiece remote from the feed rolls. Such machines suffer disadvantages in that short workpieces could not be produced because short workpieces cannot extend from the feed rolls to the remotely spaced cutters. In addition, the ability to adjust the machine without disturbing the drive trains was either difficult, or impossible. Further, the ability of the machines to feed and locate on a vertical line for providing 1:1 transfer of configuration from the template to the workpiece was not possible.

SUMMARY OF THE INVENTION

The invention particularly relates to shaper apparatus for overcoming the deficiencies of the prior art. In particular, the invention comprises providing first and second feed rolls co-axially mounted with respect to the axes of rotation for first and second shaper spindles located on opposite sides of a workpiece.

An object of the invention is to provide apparatus for producing artistically designed workpieces of varying sizes and shapes.

Another object of the invention is to provide independent drive means for the feed rolls and shaper spindles while providing a common adjustment means which provides for simultaneously varying the spacing between the feed rolls and shaper spindles without interfering with the separate drive means to the feed rolls and spindles.

Another object of the invention is to provide drive means to the feed rolls which are interfaced with a differential mechanism to permit the feed rolls to rotate at different angular velocities in accordance with the demands of an intricately curved workpiece.

A still further object of the invention is to provide drive means for the shaper spindles which includes a timing mechanism so that cutting strokes of the tool members can follow overlapping cutting strokes without interference therebetween.

With the above and other objects in view that will hereinafter appear, the nature of the invention will be more clearly understood by reference to the following detailed description, the appended claimed subject matter and the several views illustrated in the accompanying drawings.

BRIEF DESCRIPTION OF THE DRAWINGS

FIG. 2 is an enlarged sectional view, taken on line 2—2 of FIG. 1, and shows various features of the invention including horizontal and vertical adjustment means for the feed rolls and shaper spindles.

FIG. 3 is an enlarged, fragmentary, plan view of the spaced cutting members and shows that the cutting path of the respective cutting members can overlap without creating interference between the cutting members.

FIG. 4 is a sectional view, taken on line 4—4 of FIG. 2, and illustrates portions of the separate drive trains for the feed rolls and shaper spindles.

DESCRIPTION OF THE PREFERRED EMBODIMENT

Figure 1:
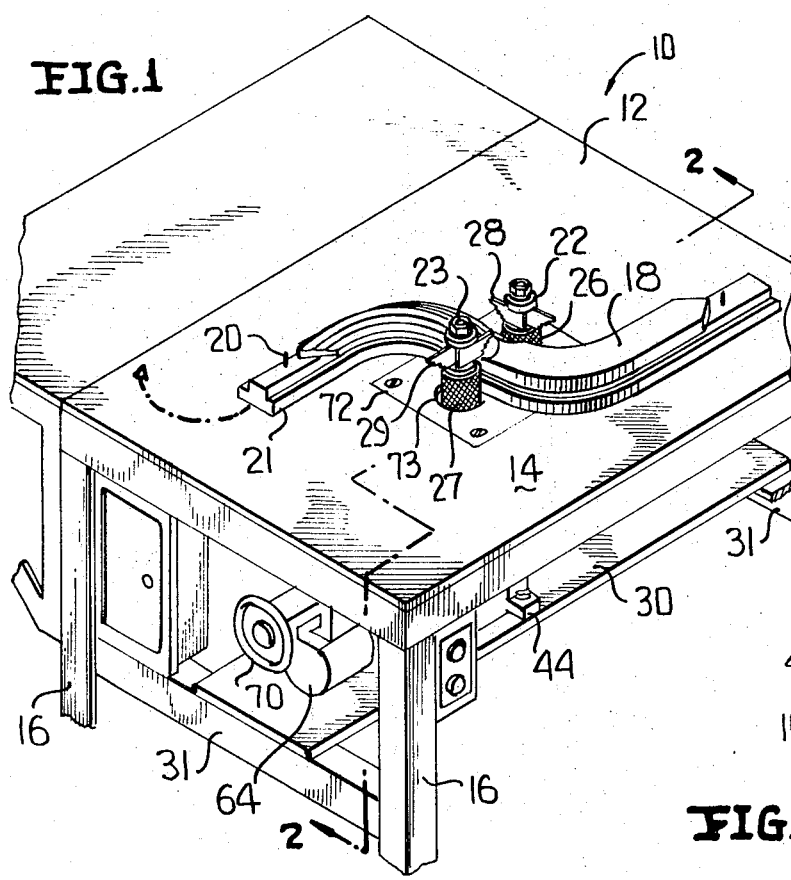
FIG. 1 is a fragmentary perspective view illustrating a typical template and workpiece being located in operative position between opposed feed rolls, and cutting members which are, respectively, co-axially aligned with the feed rolls.

Shaper apparatus, generally indicated by the numeral 10, is shown in FIG. 1 as being comprised of a work table 12 having a work supporting surface 14 and supporting legs 16. A workpiece 18, which is shown as being a partially pre-shaped piece of wood or the like, may be impaled upon sharp, short projections 20 carried by a template 21 so that the workpiece 18 can be passed between a first shaper assembly 22 and a second shaper assembly 23. It is to be understood that, during operation of the apparatus 10, a hold-down device (not shown) is provided for holding the workpiece 18 securely on the template 21 and holding the template 21 in sliding contact with work surface 14.

The first shaper assembly 22 and second shaper assembly 23 include, respectively, first and second feed rolls 26 and 27 which are rotatably driven about vertical axes and engage opposite sides of template 21 for driving workpiece 18 between a first shaping tool 28 and a second shaping tool 29 which may, as illustrated, be comprised of knives which have designed cutting edges thereon.

As is shown in FIG. 2, a mounting plate 30 extends between spaced leg members 16 and is secured to horizontal channels 31. A support stand 32 is secured to mounting plate 30 and includes a pair of spaced, vertically extending guides 33. A carriage 34 is mounted upon guides 33 and is vertically adjustable on stand 32 by an adjustment bolt 35. The bolt 35 is secured to the stand 32 by a bracket 36 and carries a threaded adjustment bar 37 which is secured to carriage 34 by suitable cap screws 38. A mandrel 40 carries the first shaper assembly 22 and is secured to carriage 34 so that adjustment of carriage 34 varies the vertical orientation of first feed roll 26 and first shaping tool 28 relative to work surface 14 in order to compensate for different heights of templates and workpieces.

Figure 5:
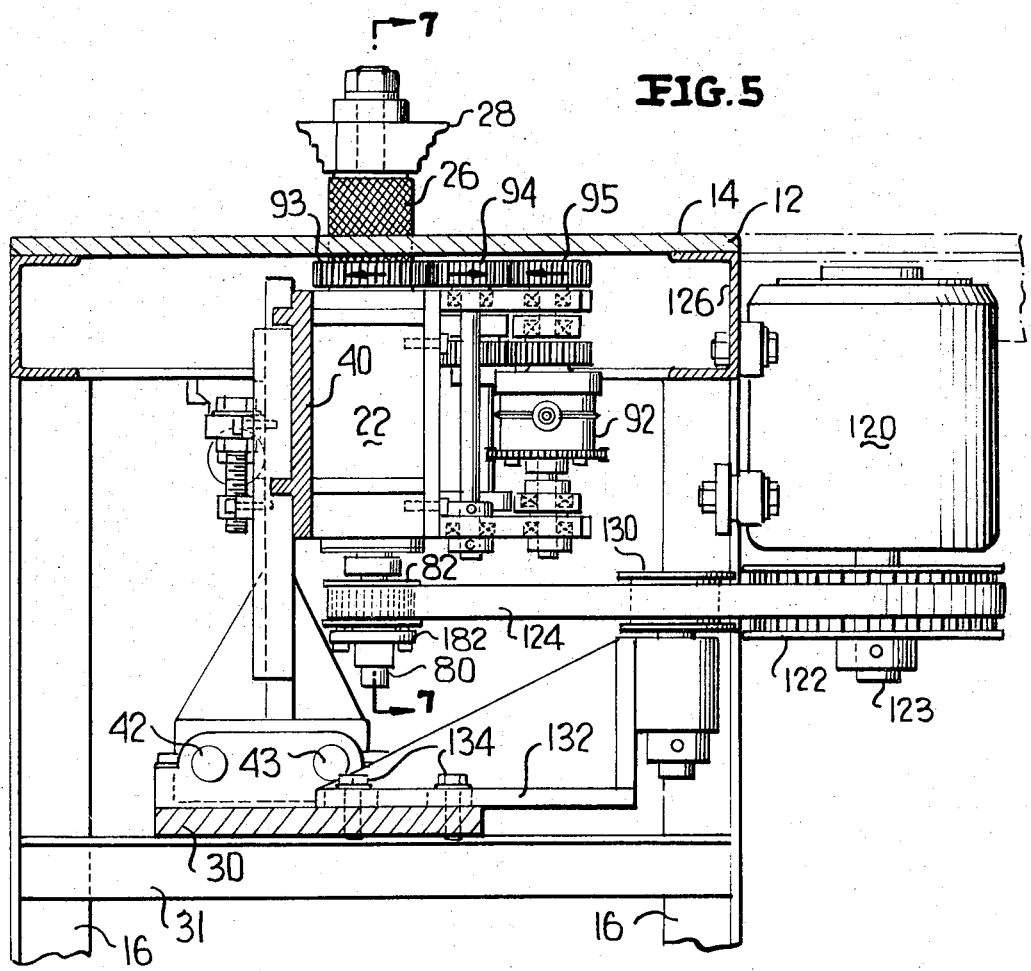
FIG. 5 is a vertical section taken on line 5—5 of FIG. 2.

As is shown in FIG. 2, 4 and 5, the second shaper assembly 23 includes second feed roll 27 and second shaping tool 29, and is mounted for vertical and horizontal adjustment relative to work surface 14. A pair of horizontally extending guide bars 42 and 43 are fixedly secured to mounting plate 30 by suitable brackets 44. A carrier member 46 is slidably mounted upon guide bars 42 and 43 and carries therewith a stand 48 which is provided with vertical guide bars 49. A carriage 50 is vertically adjustable upon guide bars 49 by an adjustment bolt 51 which is secured to stand 48 by a bracket 52. Bolt 51 is threadedly engaged with an adjustment bar 53 secured to carriage 50 by cap screws 54. A mandrel 56 is fixedly secured to carriage 50 and carries therewith the second shaper assembly 23 so that bolt 51 can vertically adjust the location of second feed roll 27 and second shaping tool 29 relative to work surface 14 in order to compensate for different heights of template 21 and workpieces 18.

In addition to being vertically adjustable, the second shaper assembly 23 is also horizontally adjustable toward and away from shaper assembly 22 for accommodating different widths of templates and workpieces therebetween. Also, during a work operation, second shaper assembly 23 is resiliently biased or urged toward first shaper assembly 22 so that second feed roll 27 and first feed roller 26 snugly engage the template 21. As previously mentioned, stand 48 is mounted upon carrier member 46 which is slidably mounted upon guide bars 42 and 43. A coupling rod 60 has one end fixedly secured to stand 48, by a bracket 61, and has the other end pivotally connected by a coupler member 62 to a piston rod 63 of an air cylinder 64. Air under pressure, from a suitable source not shown, acts upon a piston 65 to bias feed roller 27 against the template 21. In order to provide for initial horizontal adjustment of second shaper assembly 23, air cylinder 64 is fixedly secured to an adjustment plate 66 which is slidable in guideways (not shown) in a carrier plate 67. Plate 67 is securely fastened to the table 12 and carries a journal 68 for a horizontal adjustment screw 69 which is threadably engaged with the adjustment plate 66. An adjustment wheel 70 is connected to screw 69 so that rotation of the latter provides for initial adjustment of the second feed roll 27 relative to the first feed roll 26.

Horizontal adjustment of second feed roll 27 is possible because of the provision of a work plate 72 which has an elongated opening or slot 73 for accommodating feed roll 27. As shown in FIGS. 2 and 3, the cutting knives or shaping tools 28 and 29 can be positioned close enough together so that their respective cutting strokes 75 and 76 intersect with one another to provide overlapping cutting strokes for shaping the uppermost portion of workpiece 18 along its longitudinal center line.

Figure 6:
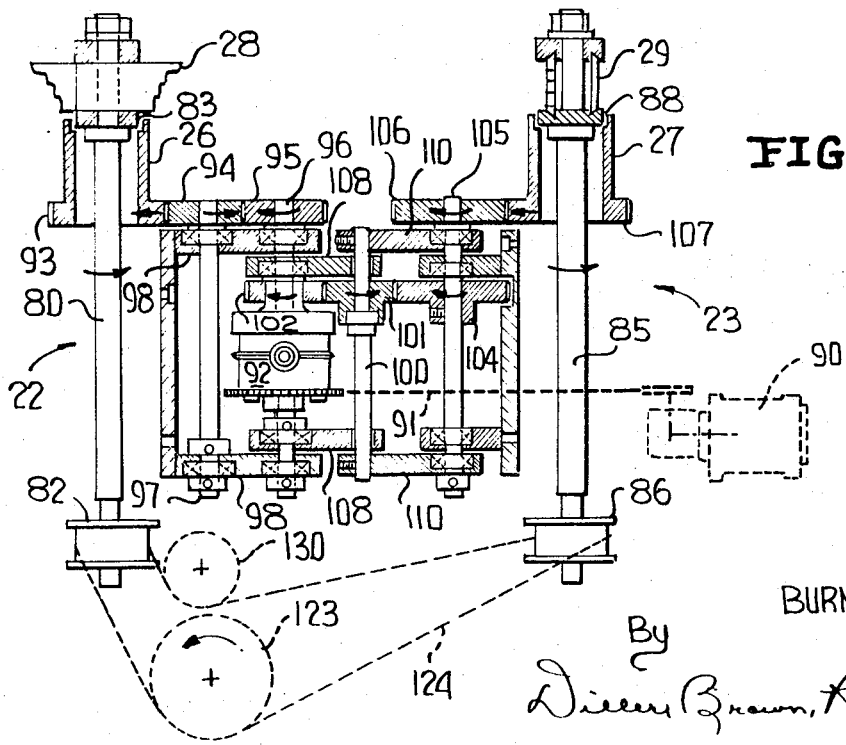
FIG. 6 is a fragmentary diagrammatic view particularly illustrating the drive mechanism for the feed rolls, portions of the mechanism being rotated out of operative position for purposes of clarity.

As is shown in FIG. 6, the first shaper assembly 22 includes a high-speed spindle 80 which has the first shaping tool 28 fixedly secured at one end thereof. At the other end of spindle 80, a pulley 82 is mounted for adjustment along the spindle and is keyed for rotation therewith. The first feed roll 26 is mounted co-axially with spindle 80 and mounted thereon by a journal 83 so that rotation of the feed roll 26 is independent of the rotation of spindle 80.

The second shaper assembly 23 includes a high-speed spindle 85 which carries the second shaping tool 29 fixedly secured at one end thereof and is rotatably driven through a pulley 86 which is adjustably mounted and keyed thereto. The second feed roll 27 is mounted co-axially upon spindle 85 by a journal 88 which provides for independent rotation of feed roll 27 and shaping tool 29.

Feed rolls 26 and 27 are driven at low speed by a motor 90 which is connected by a drive chain 91 to a differential drive mechanism 92. Feed roll 26 carries a gear 93 at the lower end thereof. Gear 93 meshes with an idler gear 94 which is driven by a spur gear 95 fixedly secured to an output shaft 96 of differential 92. Gear 94 is carried by a shaft 97 which is provided with suitable spacer brackets 98 for maintaining alignment of the shaft 97 with the differential 92.

An idler shaft 100 is spaced from differential 92 and carries an idler gear 101 which is meshed with an output gear 102 connected to a second output of differential 92. Idler gear 101 drives a spur gear 104 which is fixedly secured to a shaft 105. A second spur gear 106 is fixedly secured to shaft 105 and is meshed with a gear 107 which forms part of the second feed roll 27. Shaft 100 is spaced from differential 92 by a pair of pivot arms 108 and spaced from shaft 105 by a pair of pivot arms 110.

It is to be understood that the showing in FIG. 6 is a developed view of the drive train between the differential 92 and the feed rolls 26 and 27. In effect, the second shaper assembly 23 has been rotated 180° about the axes of differential 92. This will be more clearly understood by reference to FIG. 4 which shows the second shaper assembly 23 in operative position adjacent to first shaper assembly 22.

Figure 8:
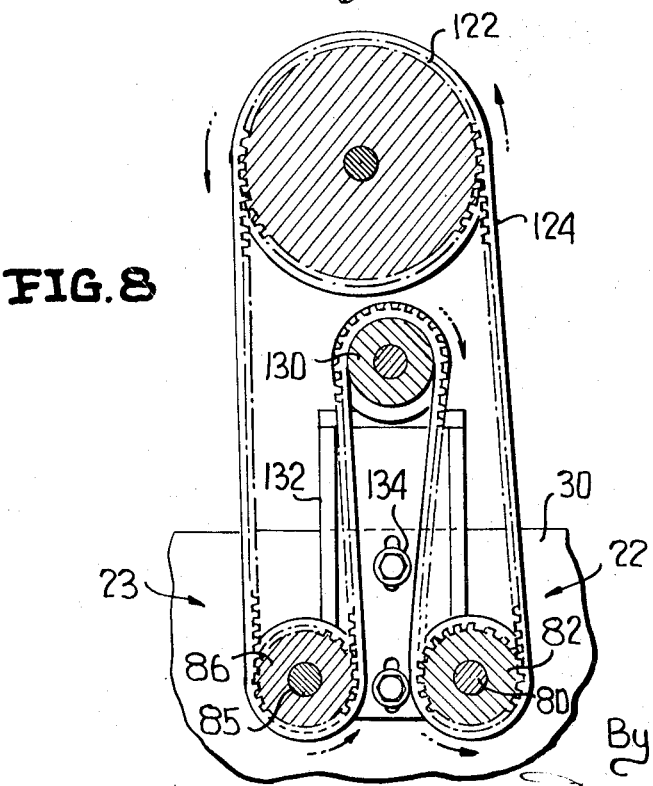
FIG. 8 is a horizontal section, taken on line 8—8 of FIG. 2, and illustrates the spaced shaper spindles as being driven in timed relationship by a single cog-belt.

The high-speed spindles 80 and 85 are driven by a drive motor 120, as shown in FIG. 5. A drive pulley 122 is mounted upon a motor shaft 123 and drives a cog-belt 124 which is entrained about pulleys 82 and 86 for driving the spindles 80 and 85 in timed relation to each other. As is best shown in FIG. 8, the driven pulleys 82 and 86, as well as the drive pulley 122, are provided with teeth which cooperate with teeth on the belt 124 for preventing slippage therebetween. The motor 120 is fixedly secured to a support channel 126 which is secured to the work table 12. Pulleys 82, 86 and 122 may be adjustably mounted upon their respective shafts for maintaining alignment of the pulleys and belt 124 when the shaper assemblies 22 and 23 are vertically adjusted relative to work surface 14.

The tension in belt 124 is adjustable by providing an idler pulley 130 which is carried upon an adjustable support member 132, as best shown in FIGS. 5 and 8. Support member 132 is adjustably mounted upon support member 30 by a pair of bolts 134.

Referring to FIG. 8, and recalling that second shaper assembly 23 is resiliently biased by air cylinder 64, it will be observed that spindle 85 and pulley 86 are movable relative to drive pulley 122 and idler pulley 130 without interfering with the function of drive belt 124.

Figure 7:
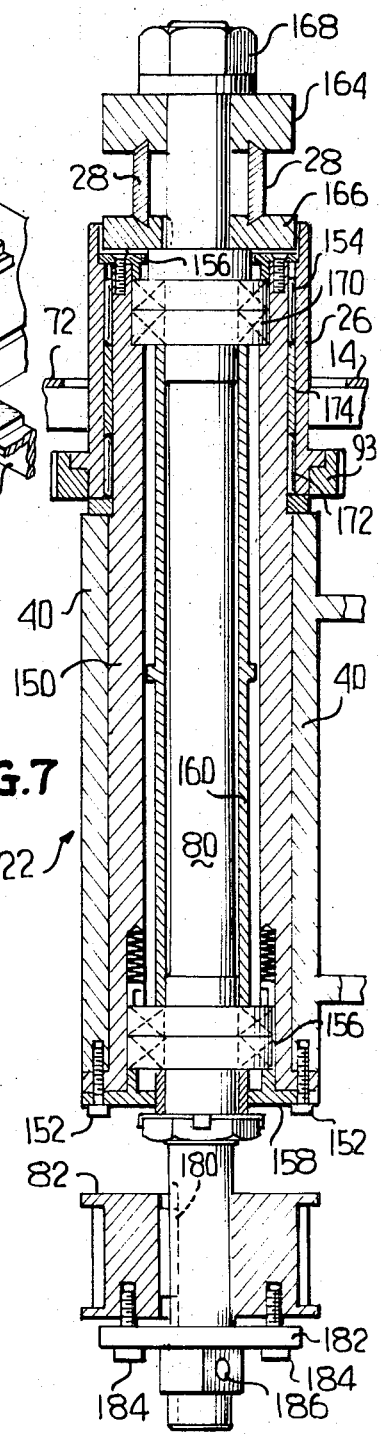
FIG. 7 is an elevation view, partly in section, showing a spindle assembly and the relationships between a feed roll and a co-axial shaper spindle.

Details of the first shaper assembly 22 are shown in FIG. 7, it being understood that the details of second shaper assembly 23 are substantially identical thereto. An annular housing 150 is carried by mandrel 40 and fixed thereto by cap screws 152. An upper set of bearings 154 and a lower set of bearings 156 are carried within housing 150 for rotatably supporting spindle 80. A set collar 156 is secured to the top portion of housing 150 for securing bearings 154, and a bearing cap 158 is provided at the bottom portion of housing 150 for securing the bearings 156. Bearings 154 and 156 are spaced from each other by an elongated spacer 160 which is, preferably, provided with an oil-mist lubrication guide (not shown).

At the upper end of spindle 80, the knives or shaping tools 28 are secured thereto by an upper collar 164 and a lower collar 166 which are secured to spindle 80 by a lock nut 168. Feed roll 26 is mounted for rotation upon housing 150 by an upper set of needle bearings 170 and a lower set of needle bearings 172 which are spaced from each other by a needle bearing spacer 174. As previously mentioned, feed roll 26 is driven by gear 93.

The drive for spindle 80 is provided by pulley 82. Pulley 82 is keyed to spindle 80, at 180, so as to rotate therewith. A set collar 182 is secured to the underside of pulley 82 by suitable cap screws 184 and includes a set screw 186 so that pulley 82 can be adjustably positioned upon the spindle 80.

From the foregoing, it will be apparent that the invention provides a novel and useful shaper apparatus, for wood-working and the like, which provides improvements over prior art devices and fulfills the objects of the invention as set forth at the beginning of this specification.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. Shaper apparatus comprising first and second feed rolls spaced from each other and having axes of rotation, first and second shaper spindles spaced from each other and having axes of rotation, the axes of said first feed roll and said first shaper spindle being co-axial, the axes of said second feed roll and said second shaper spindle being co-axial, and first drive means connected to said first and second feed rolls for driving a workpiece therebetween.

2. Shaper apparatus comprising first and second feed rolls spaced from each other and having axes of rotation, first and second shaper spindles spaced from each other and having axes of rotation, the axes of said first feed roll and said first shaper spindle being co-axial, the axes of said second feed roll and said second shaper spindle being co-axial, said first drive means including a differential drive device, and first and second drive train means respectively connected with said differential drive device and said first and second feed rolls for driving said feed rolls at the same or different angular velocities.

3. Apparatus as defined in claim 2 including adjustable mounting means for varying the spacing between said first and second feed rolls.

4. Apparatus as defined in claim 3 including biasing means for urging said second feed roll toward said first feed roll.

5. Apparatus as defined in claim 1 including adjustable mounting means for varying the spacing between said first and second shaper spindles.

6. Apparatus as defined in claim 1 including drive means connected to said shaper spindles for rotating said spindles in the same direction.

7. Apparatus as defined in claim 6 including adjustable mounting means for varying the spacing between said first and second shaper spindles.

8. Apparatus as defined in claim 7 including first and second knife means mounted, respectively, on said first and second shaper spindles.

9. Apparatus as defined in claim 8 wherein said adjustable mounting means includes means for allowing over-lapping cutting strokes for said first and second knife means.

10. Apparatus as defined in claim 9 wherein said overlapping cutting strokes are located in a common plane, said drive means including timing means for preventing interference of said first knife means with said second knife means.

11. Apparatus as defined in claim 5 including biasing means for urging said second shaper spindle toward said first shaper spindle.

12. Apparatus as defined in claim 1 including second drive means connected to said first and second shaper spindles, said first drive means and said second drive means being independent of each other.

13. Apparatus as defined in claim 12 including adjustable mounting means for simultaneously varying the spacing between said first and second feed rolls and said first and second shaper spindles.

14. Apparatus as defined in claim 13 including first and second knife means mounted, respectively, on said first and second shaper spindles.

15. Apparatus as defined in claim 14 wherein said adjustable mounting means includes means for allowing overlapping cutting strokes for said first and second knife means.

16. Apparatus as defined in claim 15 wherein said overlapping cutting strokes are located in a common plane, and said second drive means includes timing means for preventing interference of said first knife means with said second knife means.

17. Apparatus as defined in claim 16 wherein said adjustable mounting means includes biasing means for urging said second shaper spindle toward said first shaper spindle.

18. Shaper apparatus comprising first and second feed rolls spaced from each other and having axes of rotation, first and second shaper spindles spaced from each other and having axes of rotation, the axes of said first feed roll and said first shaper spindle being co-axial, the axes of said second feed roll and said second shaper spindle being co-axial, first drive means connected to said feed rolls for driving a workpiece therebetween, second drive means connected to said shaper spindles, said first drive means and said second drive means being independent of each other, said first drive means including a differential drive device, and first and second drive train means respectively connected with said differential drive device and said first and second feed rolls for driving said feed rolls at the same or different angular velocities, said second drive means being connected to said first and second shaper spindles for rotating said shaper spindles in the same sense of rotation and at common angular velocities.

* * * * *